(12) United States Patent
Han et al.

(10) Patent No.: US 6,633,568 B1
(45) Date of Patent: Oct. 14, 2003

(54) TWO-DIMENSIONAL ROUND-ROBIN SCHEDULING METHOD WITH MULTIPLE SELECTION IN AN INPUT-BUFFERED SWITCH

(75) Inventors: Man Soo Han, Cheonlanam-do (KR); Jung Hee Lee, Taejon (KR); Gab Joong Jeong, Taejon (KR); Bhum Cheol Lee, Taejon (KR)

(73) Assignees: Electronics and Telecommunications, Taejon (KR); Research Institute and Korea Telecommunication Authority, Seoul (KR)

( * ) Notice: Subject to any disclaimer, the term of this patent is extended or adjusted under 35 U.S.C. 154(b) by 0 days.

(21) Appl. No.: 09/494,729

(22) Filed: Jan. 31, 2000

(30) Foreign Application Priority Data

Oct. 14, 1999  (KR) ........................ 1999-44590

(51) Int. Cl.[7] ............................................. H04L 12/54
(52) U.S. Cl. ..................... 370/395.4; 370/428; 370/414
(58) Field of Search ................ 370/357, 395.2–395.43, 370/395.7–395.72, 412, 418, 428; 710/110

(56) References Cited

U.S. PATENT DOCUMENTS

| 5,166,926 | A | * | 11/1992 | Cisneros et al. ............. 370/392 |
| 5,517,495 | A | | 5/1996 | Lund et al. ..................... 370/60 |
| 5,923,656 | A | * | 7/1999 | Duan et al. ............... 370/395.4 |
| 6,466,343 | B1 | * | 10/2002 | Lahat et al. ................. 359/128 |
| 6,486,983 | B1 | * | 11/2002 | Beshai et al. ................ 359/117 |

OTHER PUBLICATIONS

Obara et al., "Input and Output Queueing ATM Switch Architecture With Spatial and Temporal Slot Reservation Control," *Electronics Letters*, Vol 28, No. 1, pp. 22–24, Jan. 2, 1992.

McKeown et al., "Scheduling Cells in an Input Queued Switch," *Electronics Letters*, vol. 29, No. 25, pp. 2174–2175, Dec. 9, 1993.

LaMaire et al., "Two–Dimensional Round–Robin Schedulers for Packet Switches With Multiple Input Queues," *IEEE/ACM Transactions on Networking*, vol. 2, No. 5, pp. 471–482, Oct. 1994.

Karol et al., "Improving the Perfromance of Input–Queued ATM Packet Switches," *IEEE Proc. INFOCOM '92*, pp. 110–115, 1992.

Obara, "Optimum architecture for Input Queuing ATM Switches," *Electronics Letters*, vol. 27, No. 7, pp. 555–557, Mar. 28, 1991.

* cited by examiner

*Primary Examiner*—Kwang Bin Yao
*Assistant Examiner*—Thai D Hoang
(74) *Attorney, Agent, or Firm*—Seed IP Law Group PLLC (57) ABSTRACT

A two-dimensional round-robin scheduling method with multiple selection is provided. The two-dimensional round-robin scheduling method in accordance with an embodiment of the present invention includes following steps. First step is for checking whether a request is received from the input buffer module and building mxm request matrix r(i,j), i,j=1, . . . , m. Second step is for setting mxm search pattern matrix, d(i,j), i,j=1, . . . , m. The search pattern matrix describes search sequence, S=1, . . . , m. Third step is for initializing elements of mxm allocation matrix a(i,j), i,j=1, . . . , m. The allocation matrix contains information whether transmission request is accepted and which switching plane the accepted request uses in transmission. Fourth step is for examining a request matrix in accordance with the search sequence S and finding r(i,j) that sent a request. Fifth step is for setting a(i,j) for all (i,j) pairs found in the fourth step so that elements of allocation matrix at ith row have different values in range from 1 to n and elements of allocation matrix at jth column have different values in range from 1 to n. Sixth step is for repeating the fourth step and the fifth step as the search sequence S is increased from 1 to m by 1.

6 Claims, 8 Drawing Sheets

|  | OUTPUT BUFFER MODULE | | | |
|---|---|---|---|---|
| INPUT BUFFER MODULE | 1 | 2 | 3 | 4 |
| 1 | 1 | 1 | 1 | 0 |
| 2 | 1 | 0 | 0 | 1 |
| 3 | 0 | 0 | 1 | 1 |
| 4 | 1 | 1 | 0 | 0 |

|   | 1 | 2 | 3 | 4 |
|---|---|---|---|---|
| 1 | 2 | 3 | 4 | 1 |
| 2 | 3 | 4 | 1 | 2 |
| 3 | 4 | 1 | 2 | 3 |
| 4 | 1 | 2 | 3 | 4 |

30

|   | 1 | 2 | 3 | 4 |
|---|---|---|---|---|
| 1 | 4 | 3 | 2 | 1 |
| 2 | 3 | 2 | 1 | 4 |
| 3 | 2 | 1 | 4 | 3 |
| 4 | 1 | 4 | 3 | 2 |

31

|   | 1 | 2 | 3 | 4 |
|---|---|---|---|---|
| 1 | 1 | 2 | 3 | 4 |
| 2 | 4 | 1 | 2 | 3 |
| 3 | 3 | 4 | 1 | 2 |
| 4 | 2 | 3 | 4 | 1 |

32

|   | 1 | 2 | 3 | 4 |
|---|---|---|---|---|
| 1 | 1 | 4 | 3 | 2 |
| 2 | 2 | 1 | 4 | 3 |
| 3 | 3 | 2 | 1 | 4 |
| 4 | 4 | 3 | 2 | 1 |

33

|   | 1 | 2 | 3 | 4 |
|---|---|---|---|---|
| 1 | 1 | 4 | 3 | 2 |
| 2 | 4 | 3 | 2 | 1 |
| 3 | 3 | 2 | 1 | 4 |
| 4 | 2 | 1 | 4 | 3 |

34

|   | 1 | 2 | 3 | 4 |
|---|---|---|---|---|
| 1 | 2 | 1 | 4 | 3 |
| 2 | 1 | 4 | 3 | 2 |
| 3 | 4 | 3 | 2 | 1 |
| 4 | 3 | 2 | 1 | 4 |

FIG. 10 though performance of PIM method is improved as request step, grant step, and accept step are repeated, it is fairly difficult to apply PIM method to high-speed applications because random operations are required for grant step and accept step.

TWO-DIMENSIONAL ROUND-ROBIN SCHEDULING METHOD WITH MULTIPLE SELECTION IN AN INPUT-BUFFERED SWITCH

TECHNICAL FIELD

The present invention relates to a two-dimensional round-robin scheduling method. In particular, the present invention relates to a two-dimensional round-robin scheduling method with multiple selection of input and output buffered switch.

BACKGROUND OF THE INVENTION

Generally, the performance of input-buffered switches is not as good as that of output-buffered switches due to HOL (head of line) blocking phenomenon. However, the output-buffered switch is not appropriate for high-speed link since operating speed of switch memory fabric or output buffer should be faster than N times of link operating speed. On the contrary, input-buffered switches are appropriate for high-speed link because speed of switch memory fabric such as crossbar and Batcher-banyan is same as link operating speed.

There is an architecture for mitigating HOL blocking phenomenon and it is the multiple input buffer architecture in which each input port uses a number of buffers for an output port. In this architecture, there are N input ports and each input port is connected with N queues for output ports. Therefore, there are $N^2$ input queues in total. However, since N×N switches have N input links, only N queues are selected among the $N^2$ queues and it is called contention problem. There are several methods proposed to solve the contention problem and they are PIM (parallel iterative method), SLIP, 2DRR (two-dimensional round-robin) method, and TRM (time reservation method).

PIM method consists of request step, grant step, and accept step. At request step, $N^2$ input queues send requests to output ports. At grant step, output port randomly grants a request among received requests and notifies the result to each input port. Since an output port may receive a number of grants from an input port, only one grant is randomly selected and accepted among received grants.

Even though performance of PIM method is improved as request step, grant step, and accept step are repeated, it is fairly difficult to apply PIM method to high-speed applications because random operations are required for grant step and accept step.

SLIP method does not use probability functions. SLIP method was proposed at "Scheduling cells in an input-queued switch", Electronics letters, Vol. 29, No. 25, December 1993, N. McKeown et al. and also at U.S. Pat. No. 5,500,858, N. McKeown. SLIP method utilizes round-robin scheme instead of random operations at grant step and accept step. That is, round robin pointer is used instead of the random operations. If current round-robin pointer value is i, first input port after ith input port is granted among requests received. The value of round-robin pointer is increased by one only if the grant is accepted by input port. In accept step of input port, round-robin pointer is used as well.

However, SLIP method is problematic in that synchronization problem is caused. That is, a number of output ports may grant an identical input port. In order to remove the synchronization problem, SLIP algorithm has to be repeated. In the worst case, the algorithm has to be repeated N times to converge in case that N×N switch is used. In addition, if a number of input and output ports increases, a number of requests and grants that needs to be searched at grant step and accept step increases as well. That is, if a number of input and output ports increases, it is difficult to apply SLIP method to high-speed applications.

2DRR method is proposed at "Two-dimensional round-robin schedulers for packet switches with multiple input queues", IEEE/ACM transactions on networking, Vol. 2, No. 5, October 1994, R. O. LaMaire et al. and also at U.S. Pat. No. 5,299,190, R. O. LaMaire et al. In 2DRR method, $N^2$ requests are represented by N×N matrix. Only N search steps are required to determine a request to be transmitted. The service fairness of 2DRR method is equivalent to the service fairness that SLIP in iterated N times.

In the technical paper stated above, basic 2DRR algorithm searches request matrix in sequence defined by pattern sequence matix and determines a request to be transmitted. Enhanced 2DRR algorithm proposed by the technical paper shows performed improvement for specified traffic patterns. If a number of input and output ports increases, it is difficult to apply 2DRR method to high-speed applications because search steps of the algorithm are also increased.

TRM is proposed at "Input and Output queuing ATM switch architecture with spatial and temporal slot reservation control", Electronics letters, Vol. 28, No. 1, January 1992, H. Obara et al. TRM utilizes input and output buffered switch that grouped input and output ports are used. Grouping input and output ports reduces number of queues for each input port and therefore number of requests used for contention is also decreased. A grouped input port selects a number of requests to prevent performance deterioration of switch. Overall performance of switch is improved by the statistical multiplexing gain due to the grouping.

In the paper proposing TRM, time information is used in contention control. When input buffer module sends requests to contention control module, contention control module sets transmission time and then notifies the time to input buffer module. Therefore, in case of large-scale switch, it is difficult to perform high-speed operation since the amount of time information is increased. Also, it is difficult to perform high-speed operation since number of input and output links is increased as number of input and output ports is increased.

C. Lund et. al disclosed a method at U.S. Pat. No. 5,517,495. The method is similar with the TRM and time information is used for contention control and service fairness is improved. In the invention, a request for a cell that waits for the longest time is transmitted to contention control module in consideration with priorities of output ports. Contention control module grants the longest waiting one among the received requests and notifies the result to input ports. Each input port is able to receive multiple grants from a number of output ports at the same time. Each input port accepts the longest waiting one among the received grants. Even though the method proposed by the invention U.S. Pat. No. 5,517,495 shows better performance than PIM method and SLIP method, it is difficult to apply the method to high-speed applications since time information should be sent in grant and accept steps and a minimum value is searched in the time information.

SUMMARY OF THE INVENTION

A two-dimensional round-robin scheduling method with multiple selection is provided. The two-dimensional round-robin scheduling method in accordance with an embodiment of the present invention employs input buffer modules, output buffer modules, a space division switching module and a contention control module. The input buffer module has input ports and queues. The output buffer module has output ports and queues. The space division switching module has switching planes. The space division switching module is connected with the input buffer modules through links and connected with the output buffer modules through links. The two-dimensional round-robin scheduling method in accordance with an embodiment of the present invention includes following steps. First step is for detecting whether a request signal is received from the input buffer module and building m×m request matrix $r(i,j)$, $i,j=1, \ldots, m$. Second step is for setting m×m search pattern matrix, $d(i,j)$, $i,j=1, \ldots, m$. The search pattern matrix describes search sequence, $S=1, \ldots, m$. Third step is for initializing elements of m×m allocation matrix $a(i,j)$, $i,j=1, \ldots, m$. The allocation matrix contains information whether transmission request is accepted and which switching plane is used in the transmission. Fourth step is for examining a request matrix in accordance with the search sequence of search pattern matrix and finding $r(i,j)$ that requests transmission. Fifth step is for setting $a(i,j)$ for all $(i,j)$ pairs found in the fourth step so that elements of allocation matrix at ith row have different values in range from 1 to n and elements of allocation matrix at jth column have different values in range from 1 to n. Sixth step is for repeating the fourth step and the fifth step as the search sequence S is increased from 1 to m by 1.

Preferably, the request matrix at the first step has $r(i,j)=1$ if there is a cell to be transmitted from ith input buffer module to jth output buffer module and has $r(i,j)=0$ if there is not any cell to be transmitted from ith input buffer module to jth output buffer module.

Preferably, the fifth step for all $(i,j)$ pairs which are found in the fourth step includes following sub-steps. First sub-step is for initializing variable $k=1$ where the variable k indicates switching plane number. Second sub-step is for determining whether elements of allocation matrix at ith row and elements of allocation matrix at jth column are not equal to value of the variable k. Third sub-step is for setting $a(i,j)=k$ and finishing the fifth step if the condition at the second sub-step is satisfied. Fourth sub-step is either for increasing k by 1 and returning to the second sub-step if the condition at the second sub-step is not satisfied and k is smaller than n or for maintaining $a(i,j)$ at the initialized state and finishing the fifth step if the condition at the second sub-step is not satisfied and k is equal to n.

Preferably, the fifth step for all $(i,j)$ pairs which are found in the fourth step includes following sub-steps. First sub-step is for setting $a(i,j)=1$ if elements of allocation matrix at ith row and elements of allocation matrix at jth column are all zero. Second sub-step is for setting $a(i,j)=k$ if elements of allocation matrix at ith row and elements of allocation matrix at jth column have all integers from 1 to k−1 and all the elements of allocation matrix at ith row and all the elements of allocation matrix at jth column are not k.

Preferably, the fifth step sets $a(i,j)$ using row index vector $W_p$ ($p=1, \ldots, n$) and column index vector $C_p$ ($p=1, \ldots, n$). The row index vector $W_p$ indicates that elements of allocation matrix at each row have a value of p. The column index vector $C_p$ indicates that elements of allocation matrix at each column have a value of p.

Preferably, the fifth step includes following sub-steps. First sub-step is for initializing the row index vector $W_p = (w_p(1), \ldots, w_p(m))$ and the column index vector $C_p = (c_p(1), \ldots, c_p(m))$, $p=1, \ldots, n$. Second sub-step is for determining whether $w_k(i)=0$ and $c_k(j)=0$. Third sub-step is for setting $a(i,j)=k$, $w_k(i)=1$ and $c_k(j)=1$ and finishing the fifth step if condition of the second sub-step is satisfied. Fourth sub-step is either for increasing k by 1 and returning to the second sub-step if the condition at the second sub-step is not satisfied and k is smaller than n or for maintaining $a(i,j)$ at the initialized state and finishing the fifth step if the condition at the second sub-step is not satisfied and k is equal to n. The second sub-step, the third sub-step, and the fourth sub-step are applied to all $(i,j)$ pairs.

BRIEF DESCRIPTION OF THE DRAWINGS

The embodiments of the present invention will be explained with reference to the accompanying drawings, in which.

DETAILED DESCRIPTION OF THE INVENTION

A two-dimensional round-robin scheduling method with multiple selection in an input-buffered switch is provided. In an embodiment of the present invention, input and output buffered switch that was disclosed by "Input and Output queuing ATM switch architecture with spatial and temporal slot reservation control", Electronics letters, Vol. 28, No. 1, January 1992, H. Obara et. al is used. The method proposed by the technical paper of H. Obara et. al utilizes single switch plane, an embodiment of the present invention employs multiple switch planes for high-speed operation.

For high-speed operations, the round-robin method like 2 DDR and SLIP is better than methods using time information like time reservation method. Also, like time reservation methods, a queue of each input buffer module sends one cell and therefore delay feature of cell is improved. When a cell is transmitted, it needs to be determined beforehand that which switching plane is used because there are multiple switching planes. Therefore, in an input buffer module, a number of queues needs to be selected in round-robin mechanism and at the same time, the switching plane that is to be used for the queues should be determined. In an embodiment of the present invention, search pattern matrix and allocation matrix are employed. Search pattern matrix determines round-robin operation mechanism and allocation matrix selects a number of queues in one input buffer module. Allocation matrix includes information which switching planes the selected queues use in cell transmition. Necessary steps for algorithm with N×N switch in accordance with an embodiment of the present invention are N/k. Variable k means that the group size of input and output ports are k.

Figure 1:
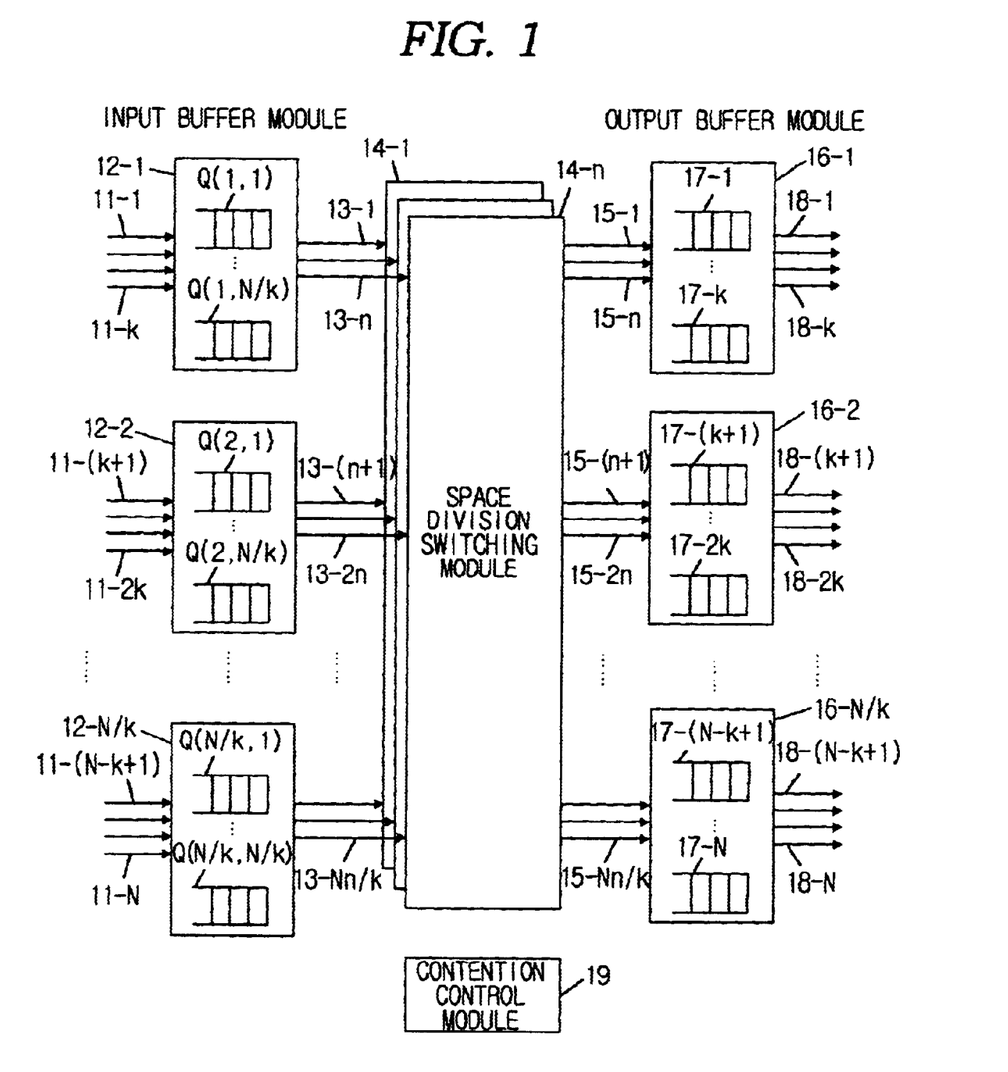
FIG. 1 is a diagram illustrating an input and output buffered switch with multiple switching planes in accordance with an embodiment of the present invention.

FIG. 1 is a diagram illustrating an input buffered switch with multiple switching plane in accordance with an embodiment of the present invention. This input buffered switch is the same switch as one used at "Input and Output queuing ATM switch architecture with spatial and temporal slot reservation control", Electronics letters, Vol. 28, No. 1, January 1992, H. Obara et. al. The advantage of this architecture is switching performance improvement due to statistical multiplexing gain from input port grouping. This input buffered switch is also appropriate for large-scale switch since input port grouping reduces number of FIFO (first-in first-out) queue considered in contention control.

Now, overall architecture and basic operation are described. The input buffered switch includes m(=N/k) k×n input buffer modules, a space division switching module, m n×k output buffer modules, and a contention control module. The space division switching module consists of m×m switching planes. There exist N input ports and k input ports are grouped into one group. The grouped input ports are connected to an input buffer module. Each input buffer module includes m FIFO queues Q(i,j), j=1, . . . , m(=N/k). Cells transmitted from input ports are routed to one of the m FIFO queues on the basis of designated output port. Cells whose designated output port is a part of output buffer module (16-j) are stored at FIFO queue Q(i,j). For example, input ports from 11-1 to 11-k are connected with input buffer module 12-1 and input buffer module 12-1 has m FIFO queues from Q(1,1) to Q(1,m). FIFO queue Q(1,1) receives cells from input ports from 11-1 to 11-k and destinations of the cells are output ports from 18-1 to 18-k that are included in output buffer module 16-1. In addition, FIFO queue Q(1,2) receives cells from input ports from 11-1 to 11-k and destinations of the cells are output ports from 18-(k+1) to 18-2k that are included in output buffer module 16-2. Likewise, FIFO queue Q(1,N/k) receives cells from input ports from 11-1 to 11-k and destinations of the cells are output ports from 18-(N−k+1) to 18-N that are included in output buffer module 16-N/k.

The contention control module 19 receives binary information from input buffer modules from 12-1 to 12-N/k. The binary information indicates whether a cell exists at HOL (head of line) of FIFO queues. Then, using the binary information, the contention control module 19 selectes a FIFO queue transmitting cells to space division switching module and assigns one of the switching planes from 14-1 to 14-n to the selected FIFO queue. The contention control module 19 reports the result to each input buffer module. Each input buffer module utilizes the reported result and transmits HOL cell of approved FIFO queue to the assigned switching planes. At the moment, each input buffer module is able to transmit maximally n cells to switching planes.

A switching plane of the space division switching module is m×m non-blocking switch and totally there are n switching planes. Only cell destination information is used for routing a cell from input links of the switch from 13-1 to 13-Nn/k to output links of the switch from 15-1 to 15-Nn/k. The output links of the switch from 15-1 to 15-Nn/k are grouped and connected with output buffer modules from 16-1 to 16-Nn/k. According to its destination output port, a cell is routed from output links of the switch from 15-1 to 15-Nn/k to a FIFO queue in output buffer modules from 16-1 to 16-Nn/k.

Each output buffer module from 16-1 to 16-Nn/k has k FIFO queues and the FIFO queues are connected with output ports. If a cell exists in a queue, a cell at HOL position is transmitted to an output port. For example, the output buffer module 16-1 has k FIFO queues from 17-1 to 17-k and is connected with k output ports from 18-1 to 18-k. The FIFO queue 17-i is connected with the output port 18-i. Here, i is a positive integer between 1 and k. Therefore, every cell time there is a HOL cell in FIFO queue 17-i, the cell is transmitted to the output port 18-i.

Now, the two-dimensional round-robin scheduling method with multiple selection in accordance with an embodiment of the present invention is reviewed.

At every cell time, each input buffer module from 12-1 to 12-N/k transmits binary information to the contention control module 19. The binary information indicates whether there exists a cell at HOL position of FIFO queue. The contention control module 19 schedules the binary information and notifies which FIFO queue is able to transmit a cell for input buffer modules and which switching planes are to be used for the FIFO queues.

For the scheduling method, request matrix, search pattern matrix, and allocation matrix are used. First, each matrix is reviewed.

Figure 2:
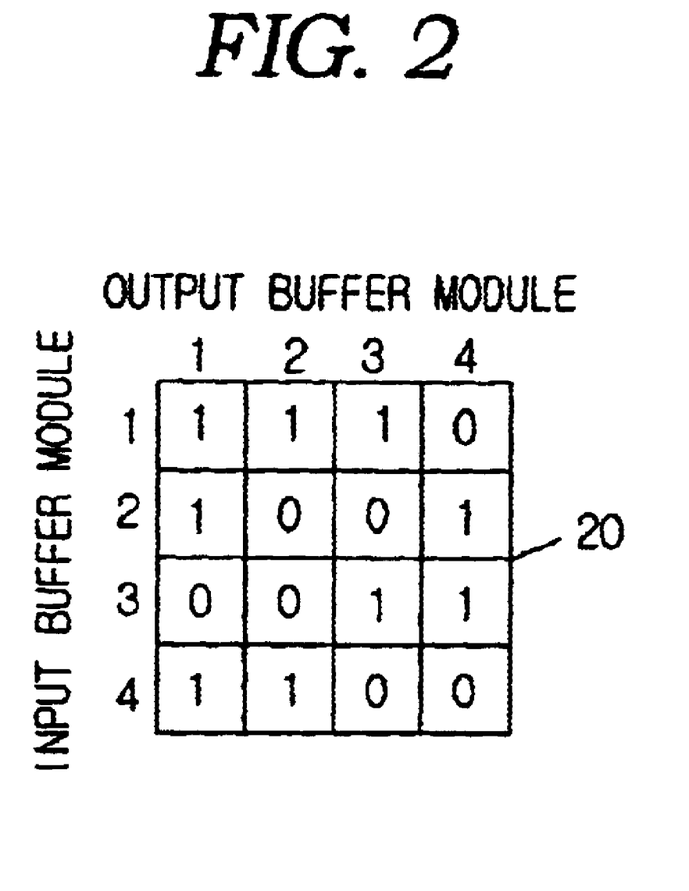
FIG. 2 is a diagram illustrating request matrix applied in an embodiment of the present invention.

The contention control module 19 utilizes the binary information transmitted from each input buffer module and forms a request matrix as shown in FIG. 2. Each element r(i,j) of the request matrix is 1 if HOL cell exists at FIFO queue Q(i,j). Otherwise, r(i,j) of the request matrix is 0. That is, if there exists a cell to be transmitted from ith input buffer module to jth output buffer module, r(i,j) of the request matrix is 1. If there is not a cell to be transmitted from ith input buffer module to jth output buffer module, r(i,j) of the request matrix is 0. Here, i is a positive integer between 1 and m and j is a positive integer between 1 and m. 20 in FIG. 2 illustrates an embodiment of the request matrix when m is 4.

Since request matrix element r(i,j) and r(g,h) represent requests from input buffer module i to output buffer module j and from input buffer module g to output buffer module h, respectively, one switching plane can be used for transmission of both requests. That is, since input buffer modules of cells are different from each other and their destination are different from each other, using one switching plane does not cause blocking and therefore the switching plane is able to transmit cells from FIFO queue Q(i,j) and Q(g,h) at the same time. That is, if two elements have different row and column indexes, then they can be searched in parallel and independently determined whether FIFO queues related with the elements are accepted for transmission.

In m×m matrix, elements of first row from 1 to m, r(1,i), i=1, . . . , m, and elements of second row from 2 to 1 via m, r(2,i), i=2, . . . , m,1, can be searched sequentially by round-robin mechanism within m steps. Likewise, elements of whole matrix may be searched in m steps. Search pattern matrix is used for indicating which element of request matrix is searched at which step.

Each element of search pattern matrix, d(i,j)=p, i=1, . . . , m, j=1, . . . , m, indicates element of request matrix r(i,j) is searched at p step. Since there are m elements whose column positions are different from each other and row positions are different from each other, maximum number of elements that can be searched independently at one step is also m. Also, elements of same row in search pattern matrix are supposed to have different values and likewise elements of same column in search pattern matrix are supposed to have different values. That is, when m matrix elements are searched at one step, elements of search pattern matrix, d(i,j), are determined so that only one element is searched at one row and one column at the same time. Also, for fairness of scheduling service, initial search position is changed in every cell time. Therefore, each element of request matrix is positioned at searching start position at every mth cell time. For instance, elements of search pattern matrix, d(i,j), can be determined by one of following methods.

$(a) d(i,j)=((i+j-1+T) \bmod m)+1$ $(b) d(i,j)=((M-i+M-j-1+T) \bmod m)+1$ $(c) d(i,j)=((M-i+j-1+T) \bmod m)+1$ $(d) d(i,j)=((i+M-j-1+T) \bmod m)+1$ T: current cell time
M=m+1

Figure 3:
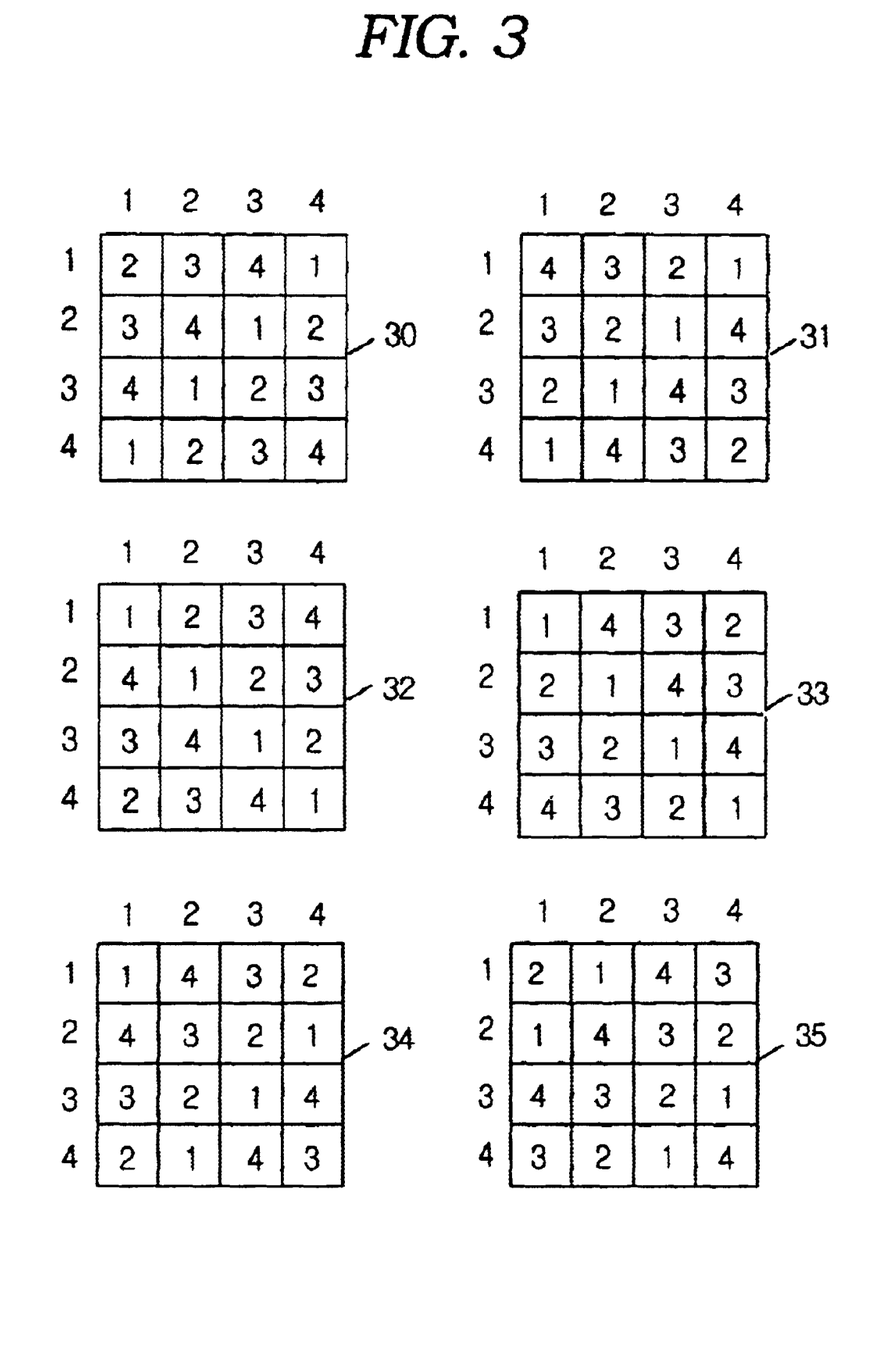
FIG. 3 is a diagram illustrating search pattern matrix applied in an embodiment of the present invention.

30, 31, 32, and 33 in FIG. 3 illustrates search pattern matrix examples of (a), (b), (c), and (d) when m=4 and T=0.

34 in FIG. 3 illustrates examples of search pattern matrix of (b) when m=4 and T=1. 35 in FIG. 3 illustrates examples of search pattern matrix of (b) when m=4 and T=2. Since m=4, each element of the search pattern matrix has value of 1, i.e., initial step of search, in every four cell time.

After the search pattern matrix is determined, two-dimensional round-robin scheduling method with multiple selection is applied. That is, as the request matrix is searched in accordance with sequence defined by the search pattern matrix, it is determined whether each element of request is accepted for transmission and which switching plane is to be used for transmission. Then, result of the determination is stored at allocation matrix. Element of allocation matrix, a(i,j), has value of 0 if r(i,j) is not accepted for transmission. If r(i,j) is accepted and hth switching plane is used for transmission, a(i,j), has value of h. Here, h is an integer between 1 and n.

Also, value of a(i,j) at same column should have different values. That is, one input buffer module can only send one cell to one switching plane. One input buffer module can send maximally n cells since the number of switching plane is n. In addition, element values at same row should have different from each other except value of zero. In other words, cells addressed to same output buffer module must use different switching planes for preventing blocking in switching. Since there are n switching planes, one output buffer module can receive maximally n cells. Elements of allocation matrix are initialized to value of zero before starting since the elements are scheduled in every cell time.

Figure 4:
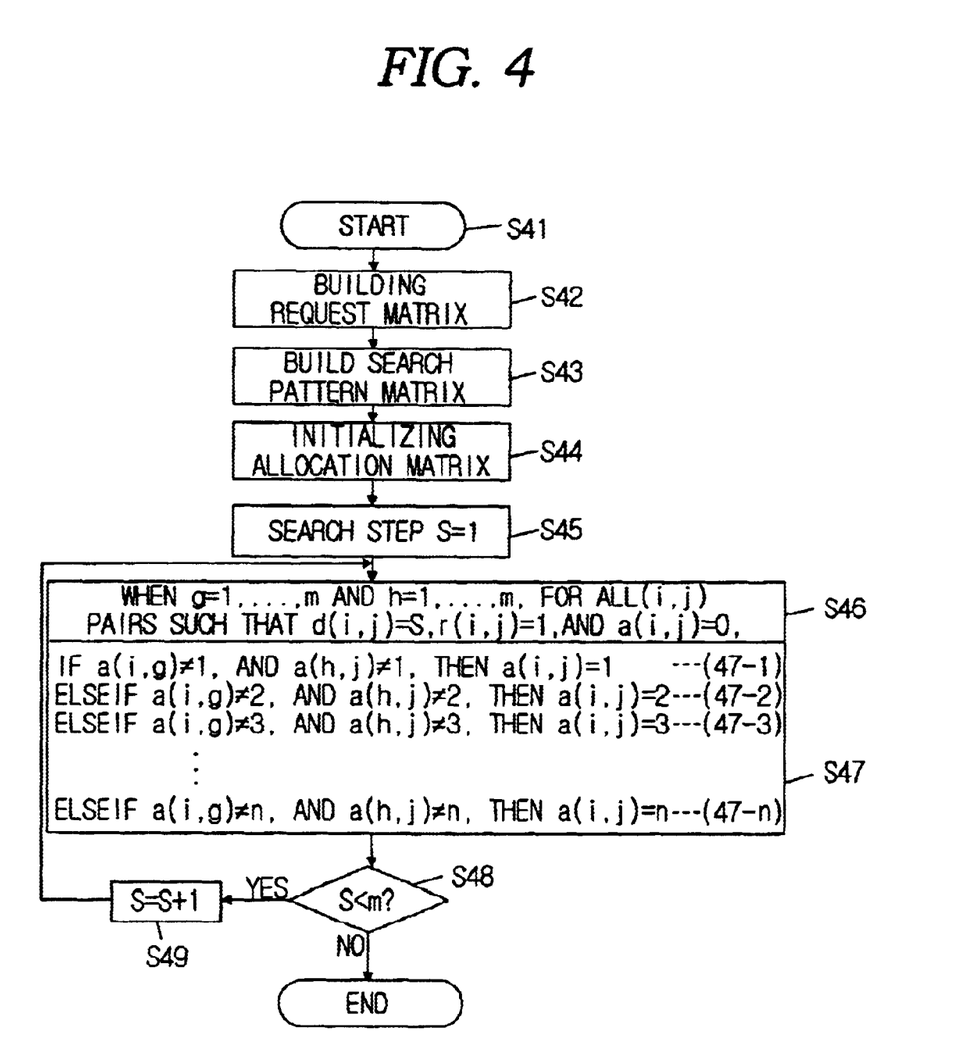
FIG. 4 is a flow diagram illustrating a two-dimensional round-robin scheduling method with multiple selection in an input-buffered switch in accordance with an embodiment of the present invention.

Now, scheduling algorithm of two-dimensional round-robin scheduling with multiple selection is described. FIG. 4 is a flow diagram illustrating a two-dimensional round-robin scheduling method with multiple selection in an input-buffered switch in accordance with an embodiment of the present invention. The contention control module repeats following process at every cell time.

First, request matrix is formed on the basis of binary information transmitted from an input buffer module at step S42. Search pattern matrix is formed at step S43. Then, allocation matrix is initialized at step 44. That is, elements of allocation matrix, a(i,j), is initialized with value of zero. Then, current search step S is set with initial value of one at step S45.

Next, a pair (i,j) satisfying d(i,j)=S, a(i,j)=0 is searched at step S46. Then, every element of allocation matrix at ith row and jth column is examined. If any element value at ith row and jth column is not value of 1, then a(i,j) is set to value of 1 (step 47-1). If the condition of the step 47-1 is not satisfied, and any element value at ith row and jth column is not value of 2, then a(i,j) is set to value of 2 (step 47-2). If the condition of the step 47-2 is not satisfied, and any element value at ith row and jth column is not value of 3, then a(i,j) is set to value of 3 (step 47-3) . . . If the condition of the pervious step, namely step 47-(n−1), is not satisfied and any element value at ith row and jth column is not value of n, then a(i,j) is set to value of n (step 47-n).

Next, current search step S is compared with total number of FIFO queues of an input buffer module, m, at step S48. If current search step S is smaller than m, the current search step S is increased by 1 at step S49 and step S46 and step S47 are repeated until current search step S reaches to m.

At step S46, there can be existed maximally m pairs of (i,j) satisfying d(i,j)=S, r(i,j)=1, and a(i,j)=0. Since they are located in different row and column, they can be processed in parallel.

Step S47 is a typical IF- ELSE IF structure. Condition at 47-1 is examined first. If the condition is satisfied, a process for 47-1 is executed. If the condition is not satisfied, 47-2 is executed. That is, 47-1 has the highest priority, 47-2 has the next highest priority and 47-n has the lowest priority. Procedure without the priority owing to the IF- ELSE IF structure is as follows.

First, for every (i,j) pairs, element values of allocation matrix at ith row and jth column are examined. If any element at ith row or jth column has not value of 1, a(i,j) is set to value of 1 (step 47'-1). If at least one element at ith row or jth column has value of 1 and any element at ith row and jth column has not value of 2, a(i,j) is set with value of 2 (step 47'-2). If at least two elements at ith row or jth column have values of 1 and 2 respectively, and any element at ith row and jth column has not value of 3, a(i,j) is set to value of 3 (step (47'-3) . . . If at least (n−1) elements at ith row or jth column have values of 1, . . . , n−1, respectively, and any element at ith row and jth column has not value of n, a(i,j) is set to value of n (step 47'-n).

Figure 5:
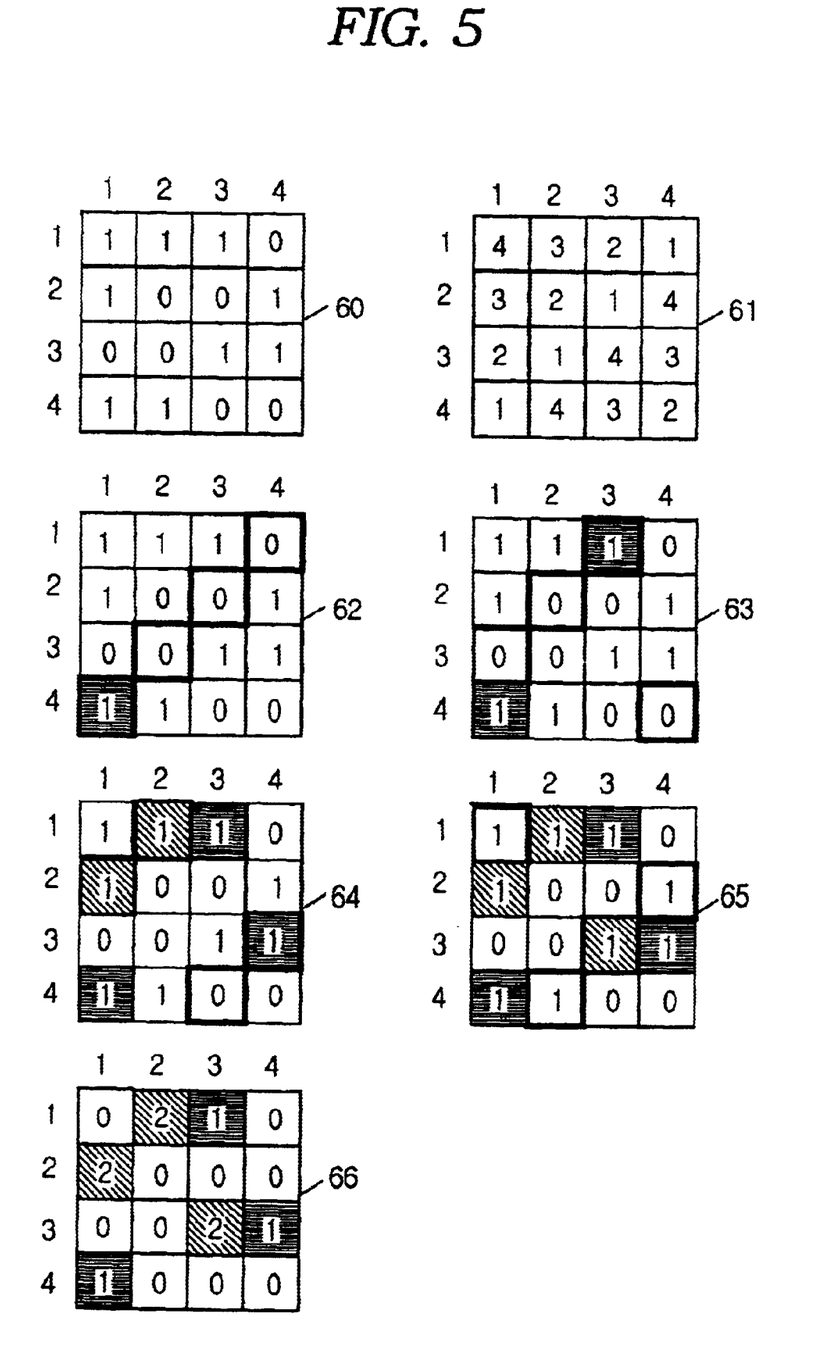
FIG. 5 is a diagram for explaining a two-dimensional round-robin scheduling method with multiple selection in an input-buffered switch in accordance with an embodiment of the present invention.

FIG. 4 illustrates an embodiment of the algorithm in the case that m=4 and number of switching planes is 2, i.e., n=2. In FIG. 5, reference number 60 indicates request matrix and 61 indicates search pattern matrix. In the search pattern matrix, elements of the matrix means search sequence. Reference numbers 62, 63, 64, and 65 show a process determining whether transmission is accepted and which switching planes are used for the transmission in accordance with the algorithm as the request matrix is searched at the determined sequence is same as the one in the search pattern matrix. A box filled with gray indicates switching plane 1 and a box filled with slanting lines indicates switching plane 2.

a(4,1), a(1,3), and a(3,4) satisfying condition of 47-1 in 62, 63, 64, and 65 are determined to be transmitted through switching plane 1. a(2,1), a(1,2), and a(3,3) are determined to be transmitted through switching plane 2 since they satisfy condition of 47-2. In FIG. 5, r(2,4) indicated by 65 is not transmitted because there are a(2,1) that has a value of 2 and a(3,4) that has a value of 1. Therefore, a(2,4) has value of zero. By similar reasons, r(1,1) and r(4,2) are not transmitted. 66 shows allocation matrix which is result of the algorithm execution.

It may become a reason speed degradation of algorithm to search every element at particular row and column of allocation matrix.

To solve this problem, the method in accordance with an embodiment of the present invention employs index indicating which values are existed in particular row and column of allocation matrix.

$W_i=(w_i(1), \ldots, w_i(m))$ is defined as row index vector. Variable $w_i(j)$ indicates that at least one elements of allocation matrix at jth row has value of i is a positive integer between 1 and n and j is a positive integer between 1 and m. If element of jth row in allocation matrix has value of i, $w_i(j)$ is 1. Otherwise, $w_i(j)$ is zero.

$C_i=(c_i(1), \ldots, c_i(m))$ is defined as column index vector. Variable $c_i(j)$ indicates that at least one element of allocation matrix at jth column has value of i where i is a positive integer between 1 and n and j is a positive integer between 1 and m. If element of jth row in allocation matrix has value of i, $c_i(j)$ is 1. Otherwise, $c_i(j)$ is zero. Row and column index vectors can be implemented by register or memory or flip-flops.

If row index vector and column index vector are used, step S47 can be performed without searching elements of allocation matrix. Then, the algorithm is modified as follows. First, step S44 is modified. That is, allocation matrix, row index vector ($W_i$) and column index vector ($C_i$) are initialized. That is, $a(i,j)=0$, $i=1, \ldots, m$, $j=1, \ldots, m$ and $w_i(j)=0$, $c_i(j)=0$, $i=1, \ldots, m$, $j=1, \ldots, m$.

Next, step S47 is modified as what follows

IF $w_1(i)=0$, $c_1(j)=0$, then $a(i,j)=1$, $w_1(i)=1$, and $c_1(j)=1$,
ELSE IF $w_2(i)=0$, $c_2(j)=0$, then $a(i,j)=2$, $w_2(i)=1$, and $c_2(j)=1$,
ELSE IF $w_3(i)=0$, $c_3(j)=0$, then $a(i,j)=3$, $w_3(i)=1$, and $c_3(j)=1, \ldots$,
ELSE IF $w_n(i)=0$, $c_n(j)=0$, then $a(i,j)=n$, $w_n(i)=1$, and $c_n(j)=1$.

The operation of modified step 47 generate the same result as the operation of S47. As a switching plane is assigned to a particular element of allocation matrix, the values of row and column index vectors are changed to denote the switching plane is used at the row and column of the particular element. Therefore, without searching elements of allocation matrix, it can be found which switching plane is already assigned by consulting rots and column index vectors. Consequently, high-speed operation is possible.

Figure 6:
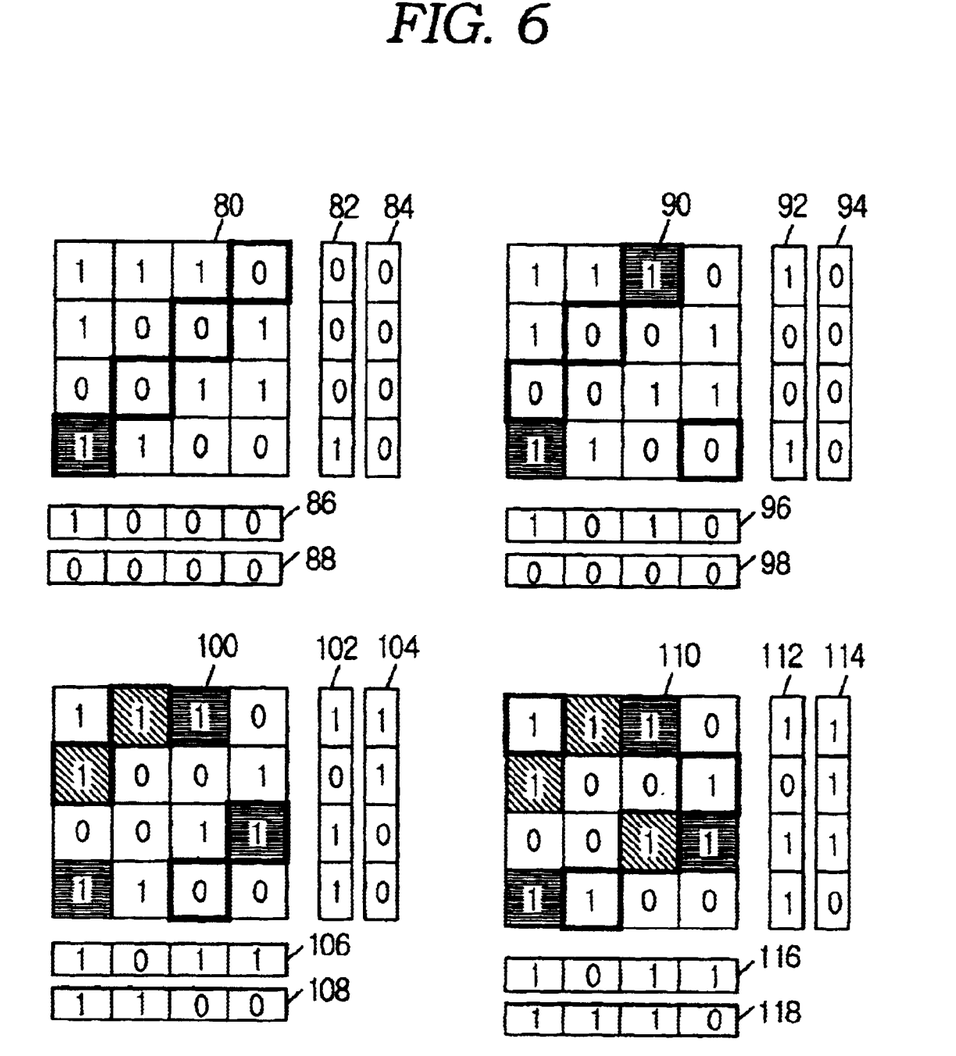
FIG. 6 is a diagram for explaining a two-dimensional round-robin scheduling method with multiple selection in an input-buffered switch in accordance with an embodiment of the present invention and algorithm speed of the method is improved.

FIG. 5 is a diagram for explaining a two-dimensional round-robin scheduling method with multiple selection in an input-buffered switch in accordance with an embodiment of the present invention. FIG. 6 illustrates a process obtaining allocation matrix using the modified steps 44 and 47 when m=4 and the number of switching planes is n=2. Request matrix and search pattern matrix are the same as ones used for an example of FIG. 45.

Steps 80, 90, 100, and 110 in FIG. 6 show a process of determining whether transmission is accepted and which switching planes are used for the transmission in accordance with the step 47 as the request matrix is searched at the determined sequence. A box with thick solid lines indicates an element that is currently searched and the sequence is same as the one in the search pattern matrix. A box filled with gray indicates switching plane 1 and a box filled with slanting lines indicates switching plane 2.

Steps 82 and 84 indicate row index vector $W_1$ and $W_2$, respectively. Element $w_1(i)$ indicates whether there is an element having value of 1 at ith row allocation matrix and element $w_2(i)$ indicates whether there is an element having value of 2 at ith row of allocation matrix. 86 and 88 indicate column index vector $C_1$ and $C_2$, respectively. Element $c_1(i)$ indicates whether there is an element having value of 1 at ith column allocation matrix and element $c_2(i)$ indicates whether there is an element having value of 2 at ith column of allocation matrix.

Since $r(1,3)=1$ at request matrix 90 and $w_1(1)=0$ and $c_1(3)=0$ indicated by 82 and 86, conditions of modified step 47-1 are satisfied. Therefore $a(1,3)=1$, $w_1(1)=1$, and $c_1(3)=1$. Even though $r(4,2)=1$ in request matrix 110, $a(4,2)=0$, which means transmission is not accepted because $w_1(4)=1$ and $c_2(2)=1$. As shown in FIG. 6 with modified step 47, the same result is obtained as FIG. 45.

Basic operations of 2DRR method are described in detail at "Two-dimensional round-robin schedulers for packet switches with multiple input queues", IEEE/ACM transactions on networking, Vol. 2, No. 5, October 1994, R. O. LaMaire et al. and also at U.S. Pat. No. 5,299,190, R. O. LaMaire et al.

If one switching plane is employed, the performance of 2DRRMS algorithm in accordance with an embodiment of the present invention is same as the performance of basic 2DRR algorithm proposed by R. O. LaMaire et. al. Enhanced 2DRR proposed by R. O. LaMaire et al. improves fairness in response to a particular traffic pattern. The particular traffic pattern is line-shaped traffic in which all cells arrived to input buffer modules are destined for a same output port. Actually, the case like this rarely happens. Also, since input ports are grouped in an embodiment of the present invention, statistical multiplexing effect is achieved and the effect prevents the line-shaped traffic.

Conventional 2DRR methods require N search steps in N×N switch. However, 2DRRMS method in accordance with an embodiment of the present invention only requires m(=N/k) search steps and therefore it is more appropriate for high-speed large-scale switching applications than conventional 2DRR methods.

Figure 7:
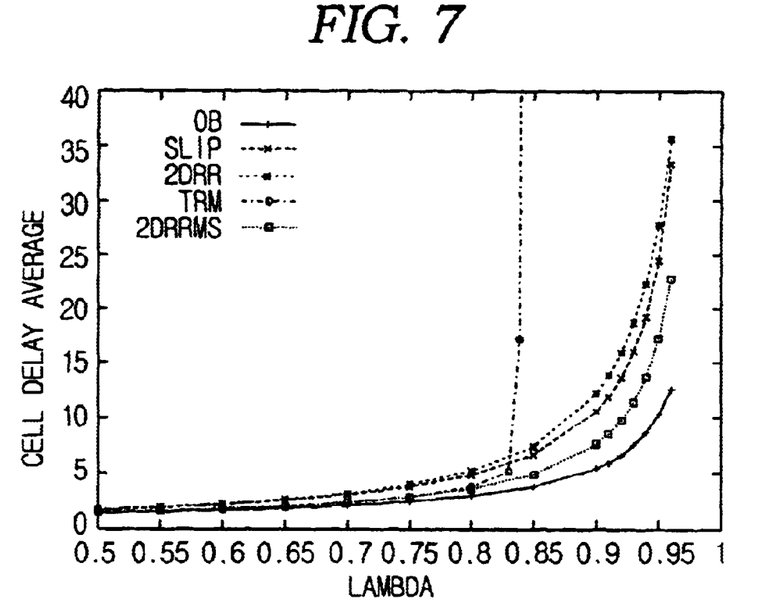
FIG. 7 through FIG. 10 are graphs illustrating effective results of two-dimensional round-robin scheduling method with multiple selection in an input-buffered switch in accordance with an embodiment of the present invention.
Figure 8:
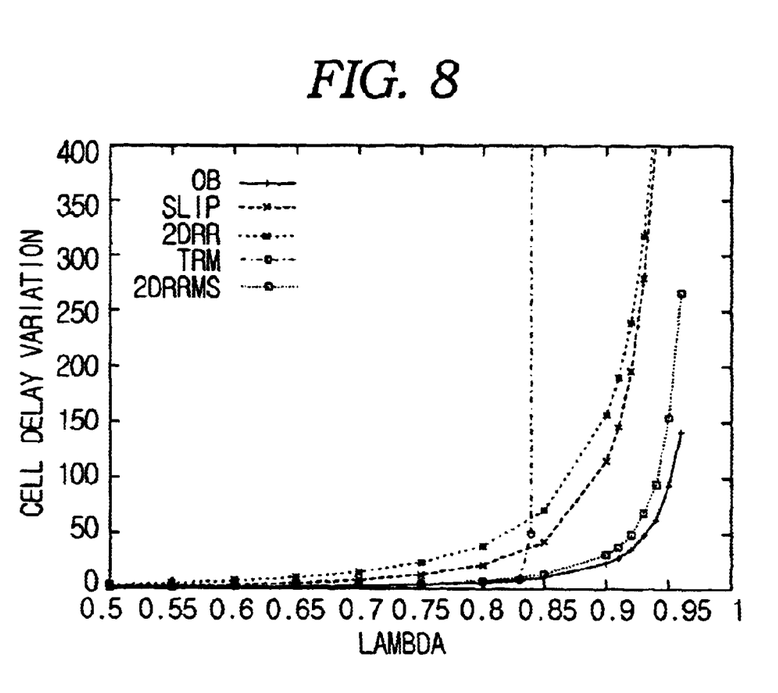

FIG. 7 and FIG. 8 are graphs illustrating effective results of two-dimensional round-robin scheduling method with multiple selection in an input-buffered switch in accordance with an embodiment of the present invention. FIG. 7 and FIG. 8 illustrate performance results of output buffer switch (OB), SLIP, 2DRR, TRM, and 2DRRMS with 64×64 switch. FIG. 7 illustrates mean cell delay (cell) of the methods and FIG. 8 illustrates cell delay variation (cell$^2$) of the methods. The traffic model for the experiment was Bernoulli arrival process and destinations of cells are uniformly distributed through output ports. Experiments were performed as input load of traffic (lambda) was increased. In the case of SLIP, 4-SLIP in which SLIP algorithm is performed four times in one cell time was used. In the case of TRM, size of the group is four and 4×4 input and output buffer modules were used. In the case of 2DRRMS, size of the group is four and number of switching planes is two, that is, n=2. Since k=4 and n=2, 2DRRMS was performed twice in one cell time.

As shown in FIG. 7 and FIG. 8, output buffer switch is superior to other methods in performance and 2DRRMS of the present invention takes the second place. However, output buffer switch is not appropriate for high-speed links.

Figure 9:
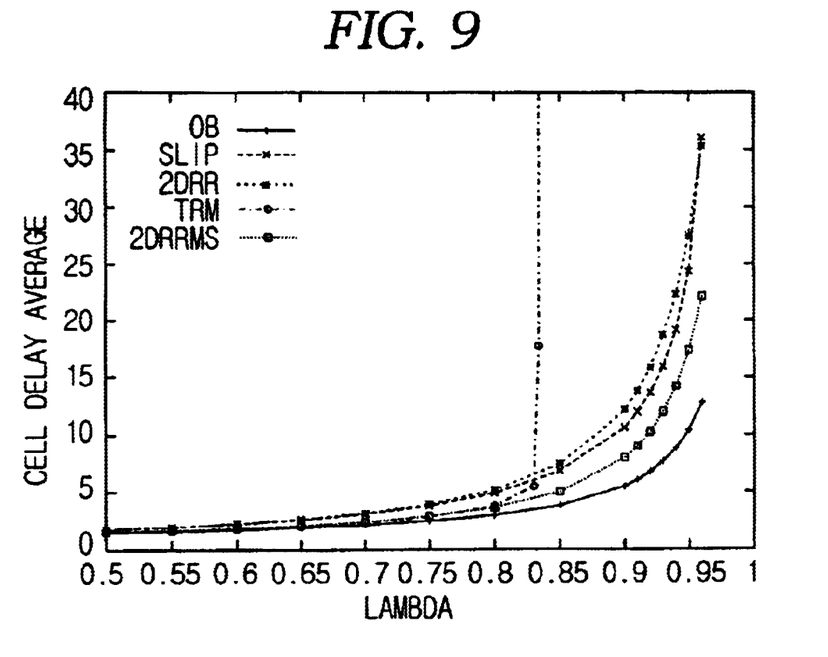
Figure 10:
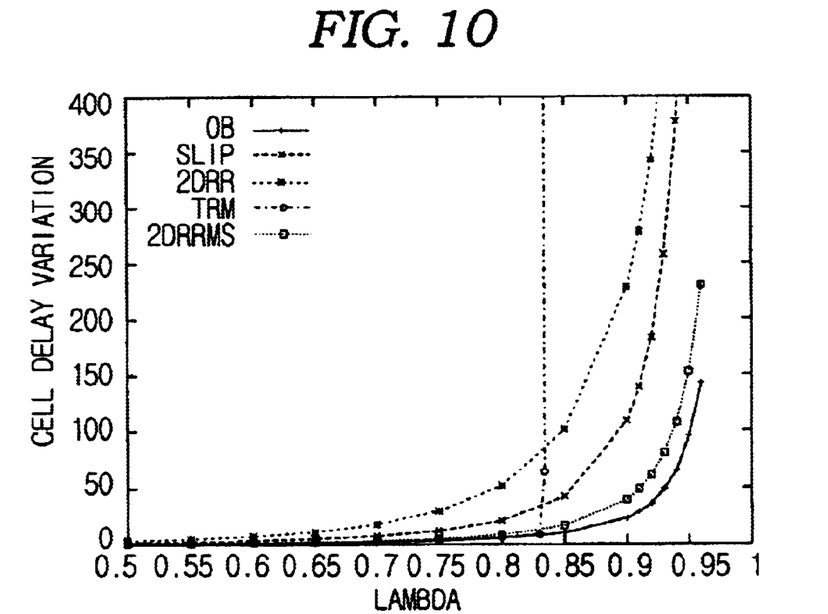

FIG. 9 and FIG. 10 are graphs illustrating effective results of two-dimensional round-robin scheduling method with multiple selection in an input-buffered switch in accordance with an embodiment of the present invention. FIG. 9 and FIG. 10 illustrate performance results of output buffer switch (OB), SLIP, 2DRR, TRM, and 2DRRMS with 128×128 switch. FIG. 9 illustrates mean cell delay (cell) of the methods and FIG. 10 illustrates cell delay variation (cell$^2$) of the methods. The traffic model for the experiment was Bernoulli arrival process and destinations of cells are uniformly distributed through output ports. Experiments were performed as input load of traffic (lambda) was increased. In the case of SLIP, 4-SLIP in which SLIP algorithm is performed four times in one cell time was used. In the case of TRM, size of the group is four and 4×4 input and output buffer modules were used. In the case of 2DRRMS, size of the group is four (k=4) and number of switching planes is four, that is, n=4. Since k=4 and n=4, 2DRRMS was performed once in one cell time.

Since basic operations of the two-dimensional round-robin scheduling method with multiple selection in accordance with an embodiment of the present invention are two-dimensional round-robin operations, it is able to work at high-speed. Also, since input ports and output ports are grouped in an embodiment of the present invention, the two-dimensional round-robin scheduling method with multiple selection in accordance with an embodiment of the present invention is able to work with large-scale systems. In addition, since the method uses small-scale switching planes for large-scale proceedings, it is relatively easy to implement and fairly practical.

Although representative embodiments of the present invention have been disclosed for illustrative purpose, those who are skilled in the art will appreciate that various modifications, additions and substitutions are possible without departing from the scope and spirit of the present invention as defined in the accompanying claims.

We claim:

1. A two-dimensional round-robbin scheduling method with multiple selection having input buffer modules, output buffer modules, a space division switching module and a contention control module, the input buffer module having input ports and queues, the output buffer module having output ports and queues, the space division switching module having switching planes, the space division switching module being connected with the input buffer modules through links and connected with the output buffer modules through links, comprising:

a first step for checking whether a request is received from the input buffer module and building mxm request matrix r(i,j), i,j=1, . . . , m;

a second step for setting mxm search pattern matrix, d(i,j), i,j=1, . . . , m, the search pattern matrix describing a search sequence, S=1, . . . , m;

a third step for initializing elements of mxm allocation matrix a(i,j), i,j=1, . . . , m, the allocation matrix containing an information whether a request is accepted and which switching plane the accepted request should use in transmission;

a fourth step for examining a request matrix in accordance with the search sequence S and finding r(i,j) that sent a transmission request;

a fifth step for setting a(i,j) for all (i,j) pairs found in the fourth step so that elements of the allocation matrix at ith row have different values in range from 1 to n and elements of the allocation matrix at jth column have different values in range from 1 to n; and a sixth step for repeating the fourth step and the fifth step as the search sequence S is increased from 1 to m by 1;

wherein m is the number of input buffer modules, n is the number of switching planes, k indicates the k-th switching plane where $1 \leq k \leq n$, and p indicates the p-th row and column index indicator associated with the p-th plane, where $1 \leq p \leq n$.

2. The two-dimensional round-robin scheduling method of claim 1, wherein the request matrix at the first step has r(i,j)=1 if there is a cell to be transmitted from ith input buffer module to jth output buffer module and has r(i,j)=0 if there is not any cell to be transmitted from ith input buffer module to jth output buffer module.

3. The two-dimensional round-robin scheduling method of claim 1, wherein the fifth step for all (i,j) pairs comprises:

a first sub-step for initializing a variable k=1, the variable k indicating a switching plane number;

a second sub-step for determining whether elements of the allocation matrix at ith row and elements of the allocation matrix at jth column are not equal to value of the variable k;

a third sub-step for setting a(i,j)=k and finishing the fifth step if the condition at the second sub-step is satisfied; and a fourth sub-step either for increasing k by 1 and returning to the second sub-step if the condition at the second sub-step is not satisfied and k is smaller than n or for maintaining a(i,j) at the initialized state and finishing the fifth step if the condition at the second sub-step is not satisfied and k is equal to n.

4. The two-dimensional round-robin scheduling method of claim 1, wherein the fifth step for all (i,j) pairs comprises:

a first sub-step for setting a(i,j)=1 if elements of the allocation matrix at ith row and elements of the allocation matrix at jth column are all zero;

a second sub-step for setting a(i,j)=k if elements of the allocation matrix at ith row and jth column have all integers from 1 to k−1 and all the elements of the allocation matrix at ith row and jth column are not value of k where k=2, . . . ,n.

5. The two-dimensional round-robin scheduling method of claim 1, wherein the fifth step sets a(i,j) using a row index vector $W_p$, p=1, . . . , n, and a column index vector $C_p$, p=1, . . . , n, the row index vector $W_p$ indicating that elements of the allocation matrix at each row have value of p, the column index vector $C_p$ indicating that elements of the allocation matrix at each column have value of p.

6. The two-dimensional round-robin scheduling method of claim 5, wherein the fifth step for all (i,j) pairs found in the fourth step comprises:

a first sub-step for initializing the row index vector $W_p=(w_1(1), \ldots, w_p(m))$, the column index vector $C_p=(c_p(1), \ldots, c_p(m))$, p=1, . . . , n, and k=1;

a second sub-step for checking whether $w_k(i)=0$ and $c_k(j)=0$;

a third sub-step for setting a(i,j)=k, $w_k(i)=1$ and $c_k(j)=1$ if condition of the second step is satisfied; and a fourth sub-step either for increasing k by 1 and returning to the second sub-step if the condition at the second sub-step is not satisfied and k is smaller than n or for maintaining a(i,j) at the initialized state and finishing the fifth step if the condition at the second sub-step is not satisfied and k is equal to n.

* * * * *

UNITED STATES PATENT AND TRADEMARK OFFICE
CERTIFICATE OF CORRECTION

PATENT NO.    : 6,633,568 B1
DATED         : October 14, 2003
INVENTOR(S)   : Man Soo Han et al.

It is certified that error appears in the above-identified patent and that said Letters Patent is hereby corrected as shown below:

<u>Title page</u>,
Item [73], the assignees should read as -- Electronics and Telecommunications Research Institute, Taejon (KR); Korea Telecommunication Authority, Seoul (KR) --.

<u>Column 11</u>,
Line 28, "round-robbin" should read as -- round-robin --.
Line 34, "...switching planes, the space division..." should read as
-- ... switching planes. The space division... --.

Signed and Sealed this

Sixteenth Day of March, 2004

JON W. DUDAS
*Acting Director of the United States Patent and Trademark Office*